United States Patent [19]

Harpster

[11] 4,065,672

[45] Dec. 27, 1977

[54] ULTRAVIOLET SENSOR AND EXPOSURE INSTRUMENT

[76] Inventor: Joseph W. C. Harpster, 11450 Overbrook Lane, Galena, Ohio 43021

[21] Appl. No.: 687,379

[22] Filed: May 17, 1976

[51] Int. Cl.² ............................................. G01J 1/42
[52] U.S. Cl. ...................................................... 250/372
[58] Field of Search ........................................ 250/372

[56] References Cited

U.S. PATENT DOCUMENTS

| | | | |
|---|---|---|---|
| 3,710,115 | 1/1973 | Jubb | 250/372 |
| 3,838,282 | 9/1974 | Harris | 250/372 |
| 3,917,948 | 11/1975 | Strutz | 250/372 |

Primary Examiner—Archie R. Borchelt
Attorney, Agent, or Firm—Gerald Smith

[57] ABSTRACT

An arrangement of selective filters, an optical converter layer and optoelectric device is disclosed having high sensitivity, linearity, and selectivity of wavelength band. The arrangement is demonstrated effectively as an ultraviolet sensing device using a commercial silicon phototransistor. An ultraviolet sensing device coupled with suitable electronics is disclosed which is capable of measuring the amount of exposure to ultraviolet light.

4 Claims, 2 Drawing Figures

ULTRAVIOLET SENSOR AND EXPOSURE INSTRUMENT

BACKGROUND OF THE INVENTION

This invention relates generally to ultraviolet sensors and more specifically to inexpensive sensors using commercially available solid state components. This invention also relates to special instrumentation utilizing ultraviolet sensors.

Thus far, measurement devices sensitive in only the ultraviolet region are generally expensive. An effective utilization of low cost semiconductor junction devices or photoconductive devices extending to wavelengths below 3,000A has not been significantly developed to permit widespread measurements in this region of the optical spectrum.

Current needs for low cost instruments to measure ultraviolet intensity and exposure are demanding. The areas requiring these devices and instruments include photography, dermatology, proof of flame, and exposure to sunlight ultraviolet.

Therefore, this invention seeks to overcome the limitations of high cost and inadequancy of prior art of high volume silicon and other semiconductor junction and photoconductive devices which are generally insensitive to ultraviolet photons and provides a detector and instrumentation for measurement and monitoring of ultraviolet radiation.

SUMMARY OF THE INVENTION

Utilizing an ultraviolet transmitting filter, visible light from the remainder of a broad spectral range light source is absorbed. The transmitted ultraviolet light impinges on a fluorescent converter layer and a certain amount is absorbed. The converter layer material is selected to emit radiant energy in the form of lower energy photons in the visible region of the spectrum in approximate proportion to the ultraviolet radiation. Because ultraviolet transmitting filters as well as material in the converter layer are generally transparent also to photons in the red and infrared, another filter is placed behind the converter layer to absorb the infrared, if needed. This second filter must, however, be transparent to the emitted photons from the converter. A silicon or other semiconductor phototransistor, photodiode, photovoltaic, or one of many photoconductors sensitive to the converter emission is placed behind the second filter. This combination then becomes a sensor having high sensitivity to incident ultraviolet and extremely low sensitivity to other wavelengths in the visible and near infrared.

Ultilizing the ultraviolet sensor, it is possible to construct low cost precision instruments to measure all or a portion of an ultraviolet flux. Ultraviolet radiation incident on the sensor produces current flow or output voltage signals which are dependent upon the intensity of the radiation. The signal may be integrated for measurement of total dose sensed with an amplifier to measure instantaneous intensity or simply threshold level detected to measure existence of ultraviolet radiation. For dose measurements, integration can be performed using a low direct current leakage capacitor followed with a high input impedance threshold detector. When threshold is reached an audible alarm, visible lamp, or other warning device may be turned on. For measurement of presence of ultraviolet radiation a threshold level amplified is employed to trip an output signal such as a relay when the sensed signal is above a predetermined low level or instrument noise level.

It is therefore an object of the invention to provide a new class of improved low cost ultraviolet radiation sensor.

It is another object of the invention to provide a new and improved radiation sensor and instrument to measure ultraviolet radiation exposure or total dose.

It is another object of the invention to provide a low cost radiation instrument to measure the presence of ultraviolet radiation.

It is a further object of the invention to provide a new and improved radiation sensor that is all solid state.

It is still another object of the invention to provide a new and improved radiation detector that it tunable to a narrow range of the radiation spectrum.

It is another object of the invention to provide a new and improved radiation detector that is more reliable and has longer service expectancy than any hitherto known.

It is another object of the invention to provide a new and improved radiation sensor that is capable of converting incident radiation to voltage.

It is another object of the invention to provide a new and improved radiation sensor that is capable of converting incident radiation to current.

It is another object of the invention to provide a new and improved radiation sensor that eliminates the need for rare and expensive exotic compound materials and components.

DESCRIPTION OF THE PREFERRED EMBODIMENTS

Figure 1:
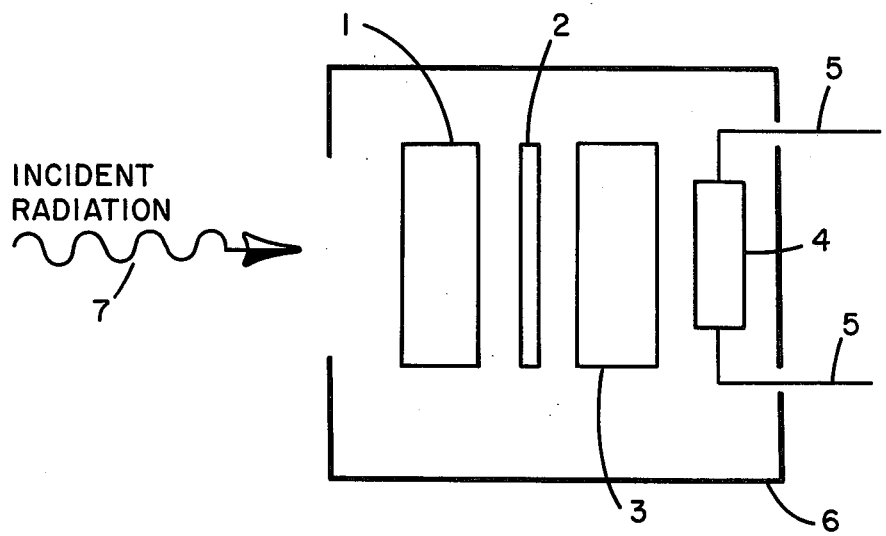
FIG. 1 is a schematic representation of a sensor arrangement.

Referring now to FIG. 1 there is shown a radiation sensor. Filter 1 is an ultraviolet transmitting material such as a glass which selectively passes from a broad spectral range radiation source a portion of the ultraviolet and in general a portion of the infrared radiation. The intermediate visible region is absorbed by filter 1.

Transmitted ulraviolet radiation is incident on converter 2, which contains an ulraviolet-excitable luminescent material. From a broad range of available converter materials both the excitation radiation band and the emission band are generally selectable. The converter material may be in the form of powders or obtained as a solution containing a binder for brush painting or spraying which may be applied directly to filter 1.

The detector element 4 is generally sensitive to near infrared which may be present in the incident radiation 7 and transmitted by filter 1 and also passed by the converter layer. To make the sensor respond to ultraviolet only, a second filter 3 is used to absorb the infrared radiation. It must however be transparent to the converter layer emission.

The converter layer emission band is selected from a variety of materials such that its peak wavelength is within the spectral sensitivity region of detector element 4. The detector element having electrical leads 5 will sense and provide an output signal due only to emission from the converter which is produced by absorption in the converter of selected ultraviolet in the incident radiation 7. If the detector element 4 is sensitive to long wave ultraviolet which can pass both filters 1 and 3 and the converter, then it also will add to the output signal. A shield 6 is provided to block out stray radiation. The combination of elements 1, 2, 3, 4, and 6 make up the ultraviolet sensor of this invention.

Examples of commercially available components which may be utilized are Corning filter 7-54 for filter 1, Daz-L No. 833 fluorescent spray for the converter 2, Corning filter 4-96 for filter 3, and General Electric L14E4 phototransistor for the detector element 4. It will be understood that the particular nature and makeup of the individual components is unimportant to the inventive concept of the sensor so long as there exists compatibility. Any form of photosensitive semiconductor junction, photoconductive or photovoltaic device of the optoelectric type may be employed as the detector element. Other filters and converters may also be utilized. Filter 3 may also be eliminated if no long wave radiation exists in the radiation source or if the detector element is insensitive to the long wave radiation.

Figure 2:
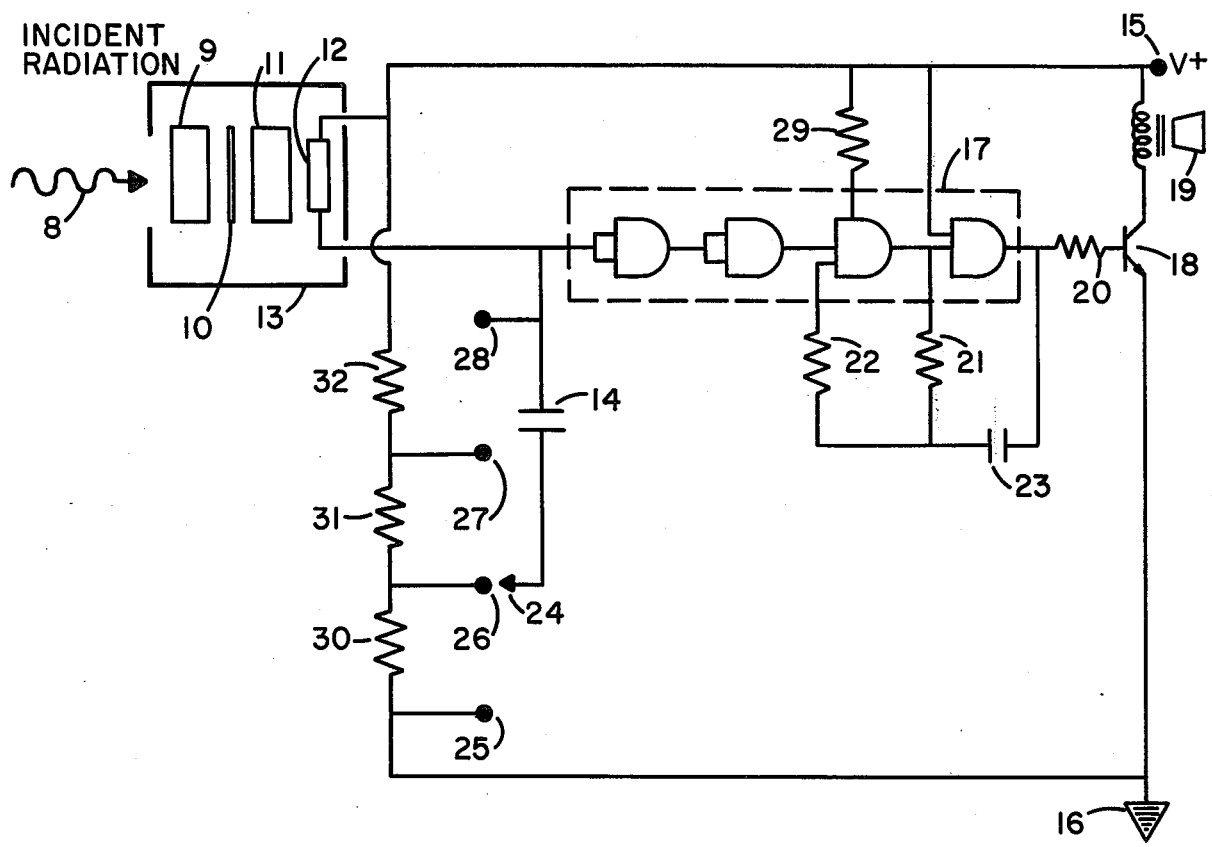
FIG. 2 is a schematic representation of an instrument for measuring exposure to ultraviolet radiation.

Referring now to FIG. 2, there is shown an instrument which utilizes an ultraviolet sensor of which FIG. 1 is an example. This instrument integrates a signal which is caused by the incident ultraviolet radiation and sounds an alarm following accumulation of a preselected amount of the incident radiation.

The representative sensor consists of an ultraviolet transmitting filter 9, a converter layer 10, a visible transmitting filter 11, detector 12, and light shield 13.

The integration capacitor 14 is charged by an ultraviolet induced current flow through the sensor under bias from a 9-volt battery having its positive terminal at 15 and its negative terminal at 16. Amplifier 17 applies a bias to the base of transistor 18 when the positive side of capacitor 14 is charged to a certain potential. This bias causes transistor 18 to conduct current and so long as signal is applied to the input of amplifier 17 of sufficient value speaker 19 sounds at a frequency determined principally by resistors 20, 21 and 22 and capacitor 23.

The time taken for capacitor 14 to reach the certain turn-on potential is determined by the approximate average of ultraviolet light intensity, initial charged state, and leakage of capacitor 14, and the position of switch 24 which provides selection of one of three time constants. The longest time constant would be for switch position 25 at ground or battery negative potential 16. The shortest integration time is for switch position 27 placing the negative side of capacitor 14 closest to positive potential. Switch position 28 shorts the capacitor so that a new selectable integration interval may be started. Resistor 29 provides current limiting to the amplifier.

A compatible selection of components suitable for measuring exposure to ultraviolet light from an unobstructed sun spectrum for periods up to one hour is as follows: UV sensor, as described above. Amplifier 17 can be a CMOS device CD 4011. Transistor 18 is of the switching type 2N3904. Speaker 17 is an 8 ohm type. Capacitor 23 is 0.001 mf. Resistors 29, 20, 21 and 22 are 68, 10K, 470K, and 680K ohm respectively. The resistor chain 30, 31, and 32 provides a voltage divider which have values 68K, 33K and 150K ohms respectively. Capacitor 14 is a sprague TE-1108.5. As a sun light ultraviolet exposure meter integrating times can be obtained at approximately 1 hour, 30 minutes, and 15 minutes, with this arrangement.

Slight modifications of the configuration of FIG. 2 may be made to obtain a detector circuit which senses the presence of a gas flame or other flame since ultraviolet light may be inherent in the flame. Switch 24 and the resistors 30, 31 and 32 are eliminated. Capacitor 14 may be made small and a resistor having a value of about 2 meg ohms or higher placed across the capacitor to ground. The alarm will sound in a time depending on the input RC time constant and intensity of incident ultraviolet light.

This circuit utilizing inexpensive components may be reconfigured to be fail safe for application as a low cost proof of flame sensor.

What is claimed is:

1. Apparatus for monitoring animal exposure to sunlight in accordance with a predetermined allowable dosage of ultraviolet radiation, comprising:

a portable housing;

an ultraviolet sensor situate within said housing and including;

an ultraviolet transmitting and visible light absorbing filter positioned for exposure to said sunlight and characterized in absorbing radiation incident thereupon in the visible region while transmitting radiation in the region of about 200 to 400 nanometers;

a converter layer of the phosphorescent type adjacent to said ulraviolet filter for absorbing ultraviolet radiation transmitted therethrough to emit radiation in the visible spectrum;

a second filter adjacent to said converter layer for transmitting said visible radiation and absorbing infrared radiation which may pass through said ulraviolet transmitting filter an said converter layer;

an optoelectronic detector positioned adjacent said second filter and having an electrical response in correspondence with the intensity of incident ulraviolet radiation on said ultraviolet filter; and a radiation shield enclosing the edges of said ultraviolet transmitting filter, said converter, said second filter and said detector to prevent the entrance thereto of stray radiation;

an exposure monitoring circuit situate within said housing, comprising;

timing circuit means including capacitor means coupled in current integrating relationship with said detector and means for asserting a predetermined value of bias voltage upon said capacitor means, for deriving a voltage signal over an interval of time corresponding with said level of said optoelectronic electrical response and said bias voltage value;

threshhold responsive amplifier means coupled for response to said timing circuit means voltage signal and having an output when said voltage signal closely approaches a predetermined value;

alarm means having a perceptible output in the presence of said threshhold responsive amplifier means output; and power supply means situate within said housing for powering said exposure monitoring circuit.

2. Apparatus according to claim 1 wherein:

said threshhold responsive amplifier means is present as a high input impedance analogue amplification means; and including display means for indicating accumulated ultraviolet radiation dose.

3. The apparatus of claim 1 wherein said timing circuit means for asserting a predetermined value of bias voltage includes:
a voltage divider network of resistors connectible between said power supply and capacitor means;
means electrically communicating with selected ones of said resistors, and
manually actuable selector switch means selectively connectible with said communicating means and said resistors for providing differing said values of said bias voltage to selectively vary the time of development of said voltage signal in accordance with predetermined values of said ultraviolet radiation dosage.

4. The apparatus of claim 3 in which said selector switch means is configured for manual actuation to an orientation effecting the removal of residual charge from said capacitor means.

* * * * *